United States Patent [19]
Justice

[11] Patent Number: 5,133,291
[45] Date of Patent: Jul. 28, 1992

[54] PET FEEDING STATION

[76] Inventor: Sharon D. Justice, 3515 28th St., #205, Boulder, Colo. 80301

[21] Appl. No.: 671,475

[22] Filed: Mar. 19, 1991

[51] Int. Cl.$^5$ ............................................ A01K 5/00
[52] U.S. Cl. ................................. 119/51.01; 119/19
[58] Field of Search ............... 119/51.01, 19, 51.5, 119/52.4, 63; 43/131

[56] References Cited

U.S. PATENT DOCUMENTS

| | | | |
|---|---|---|---|
| 2,532,681 | 12/1950 | Storer | 43/131 |
| 2,896,361 | 7/1959 | Allen | 43/131 |
| 3,094,805 | 6/1963 | Luck | 43/131 |
| 3,552,356 | 1/1971 | Rosenthal | 119/28.5 |
| 3,772,820 | 11/1973 | Bond | 43/131 |
| 4,349,982 | 9/1982 | Sherman | 43/131 |
| 4,366,773 | 1/1983 | Johanneck | 119/19 |
| 4,453,337 | 6/1984 | Williams | 119/51.01 |
| 4,520,758 | 6/1985 | Pfriendes | 119/19 |
| 4,886,016 | 12/1989 | Atchley | 119/61 |

FOREIGN PATENT DOCUMENTS

| | | | |
|---|---|---|---|
| 2227818 | 11/1974 | France | 119/19 |
| 2408301 | 7/1979 | France | 119/19 |
| 2517930 | 6/1983 | France | 43/131 |

Primary Examiner—Gene Mancene
Assistant Examiner—Todd E. Manahan
Attorney, Agent, or Firm—Edna M. O'Connor; Gregory W. O'Connor

[57] ABSTRACT

A feeding station for cats or other small animals comprises an open bottomed, generally opaque, box-like enclosure which sits on the floor to surround the feeding dishes for a small domestic animal, such as a cat. The enclosure includes at least one opening to give the animal access to the food dishes. The enclosure is preferably formed with a continuous lower edge to help prevent food displaced from the surrounded dishes from scattering outside the enclosure. The access opening for the animal is preferably circular and is sized to prevent a larger animal (or toddler) from getting to the food dishes. A transparent trap door in the top of the enclosure permits easy inspection and access to the food dishes.

10 Claims, 1 Drawing Sheet

PET FEEDING STATION

BACKGROUND OF THE INVENTION

The invention relates to a feeding station or box for cats or other small animals. The feeding station or box is large enough to accommodate the entire animal to be fed.

In the past, animal feeding stations have been provided for containing a food receptacle or dish. The station may be large enough to accommodate the head of the animal for feeding. Such a feeding station is shown in U.S. Pat. No. 4,029,051 to McKinney. The animal feeding device of this patent is not sized to enclose the entire animal and thus does not allow for a secure and protected feeding environment. Also, this feeding device has a closed bottom which can make clean up difficult and nothing is provided to help prevent the device from slipping across the floor when jostled, thus increasing the chances of spilling the food dish.

Feeders have also been provided which can hold both food and water dispensers. Such is shown in U.S. Pat. No. 4,860,691 to Mayer, and U.S. Pat. No. 3,776,193 to Post, Sr. However neither of these patents disclose feeders sized to accommodate the animal to be feed and thus do not provide privacy or security for the animal.

Frequently, poison is added to food to eliminate pest animals such as rats and mice. Enclosed feeders have been used to hold the poisonous food and to isolate it from children and household pets. Such feeders are shown in U.S. Pat. No. 3,015,184 to Scott et al, and U.S. Pat. No. 2,944,364 to Kelly. Both feeders are concerned with containing the poisoned food and thus use a closed bottom which does effectively contain the poisoned bait, but must be disassembled for thorough cleaning.

A bird feeder or shelter is shown in U.S. Pat. No. 4,753,195 to Maggio. Again the feeder has a closed bottom for supporting the animal to be fed. This feeder is designed to be mounted directly on a window or a window sill. Thus the problem of slippage on a floor or other flat surface is not a concern. With the closed floor clean-up can be more time consuming and difficult.

SUMMARY OF THE INVENTION

The invention comprises an open bottomed, box-like enclosure or feeding station which sits on the floor to surround the feeding dishes for a small domestic animal, such as a cat. The enclosure includes at least one opening to give the animal access to the food dishes. The enclosure is preferably formed with a continuous lower edge to help prevent food displaced from the surrounded dishes from scattering outside the enclosure. The access opening for the animal is preferably circular and is sized to prevent a larger animal (or toddler) from getting to the food dishes. A transparent trap door in the top of the enclosure permits easy inspection and access to the food dishes.

The enclosure is essentially portable, that is not fastened to a wall or to the floor or structure supporting the device and of a size and weight to be manually lifted. However, in order to permit it to properly protect the food (and water) from spilling, (or at least not to make worse any spillage problem, since the feeding station or enclosure takes up considerably more floor space than the typical food dish), the enclosure is made to resist sliding over the floor if kicked or jostled. This is accomplished by the combination of making the enclosure from relatively heavy materials, or if not inherently heavy, providing for easy addition of weight to the otherwise light structure. In the preferred embodiment, the enclosure is made of ⅜" composition wood or particle board. Alternatively, the device could be made of lighter materials, but provided with a raised lip about the upper surface to hold massive materials, such as bricks or even canned or bagged pet food.

Also, the device is provided with a continuous bead or gasket of high friction rubber or the like around the bottom edge of the peripheral walls. This increases the frictional engagement between the enclosure and the floor on which it rests, thus preventing movement of the enclosure except under the most vigorous of impacts.

Another optional feature of the feeding station is the addition of floor level openings which are sized to accept the feeding trays of conventional continuous filling-type feeding dishes. Again, the massiveness of the enclosure helps prevent accidental spills.

Thus, the various features and their interaction are intended to accomplish the following:

I. prevent larger pets from consuming the smaller pet's food while providing the smaller pet a sense of shelter and protection while feeding.

II. prevent the food from accidentally spilling.

III. prevent food that has spilt from the animals food dish from scattering over the floor, and to provide an easy clean-up for such food.

IV. provide a sturdy, flat surface above the food dishes for a step stool, support for a large supply of pet food, etc.

DETAILED DESCRIPTION OF THE PREFERRED EMBODIMENT

Figure 1:
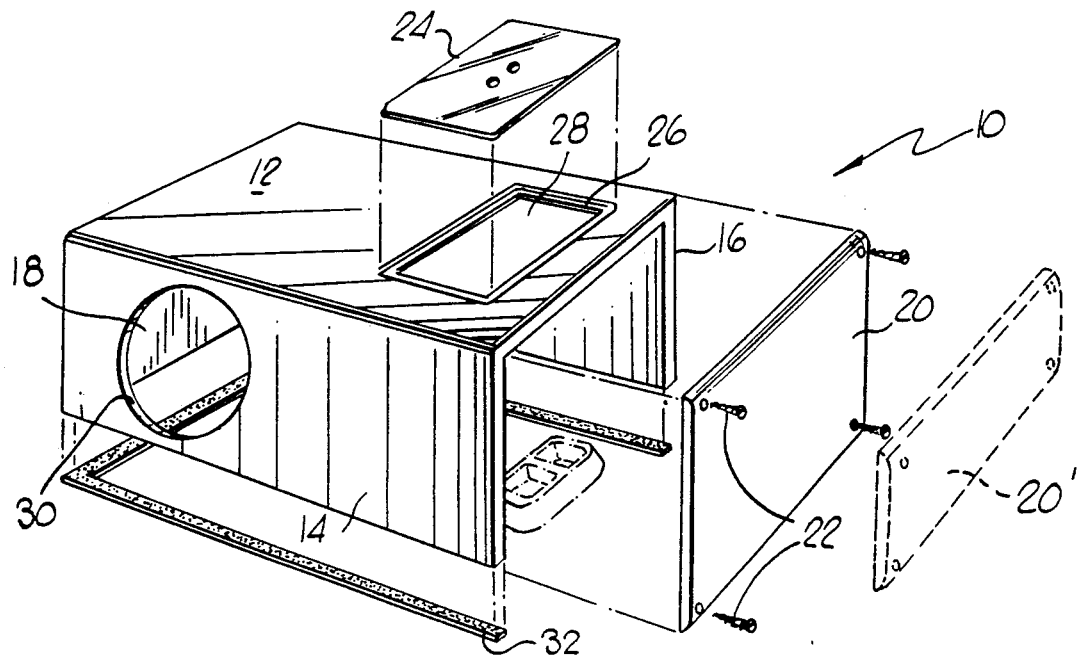
FIG. 1 shows an exploded view of the preferred embodiment.
Figure 2A:
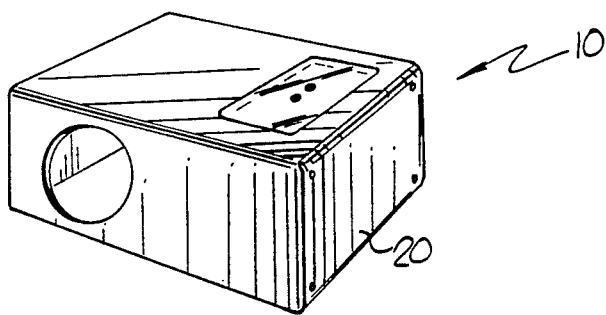
FIG. 2a shows one alternative construction.
Figure 2B:
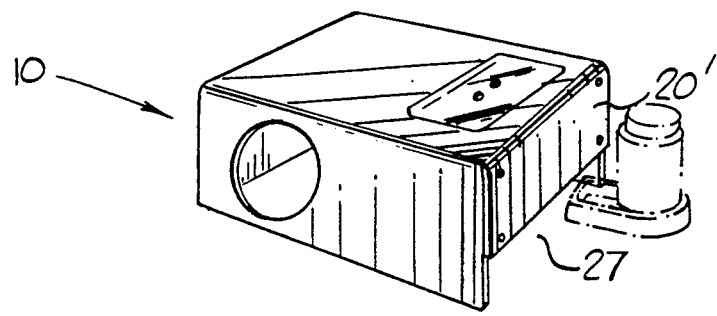
FIG. 2b shows another construction.

The feeding station 10 comprises a free standing box like construction with a generally horizontal, flat top member 12 and three permanently attached sides 14, 16, and 18. The fourth side 20 is preferably attached with screws 22 or some other releasable fasteners. An alternate side panel 20' may be provided so that the user can choose whether to create a solid barrier (FIG. 2a) or one with a rectangular opening or slot 27 at floor level (FIG. 2b). The top member 12 and sides 14, 16, 18, and 20 are formed of opaque material to provide a measure of privacy and for a neat appearance.

The top member 12 is generally featureless except for a transparent, removable hatch 24 set into its upper surface in a routed groove 26 around an equivalently sized opening 28 through which access can be provided to the interior of the station 10. Sides 14 and 16 each include a circular opening 30 sized to permit the animal to be fed to enter into the enclosure. A generally continuous strip of high friction material 32 is fastened along the lower edges of preferably the three normally fixed sides. This high friction material and the weight of the station (or weight added to the station) will help hold the device relatively fixed on the supporting floor and help prevent accidentally spilling food from the enclosed food dish (not shown).

For one execution of the invention, the side and top panels were made of high density wood particle board and assembled to form a box with approximate dimensions of 11 inches tall by 17 inches wide and 23 inches long. A removable hatch was made of ¼ inch thick clear acrylic plastic sheet. Two finger holes were cut through the plastic hatch door for easy removal from the routed ledge 26. The two opposite sides had a circular openings 30 about 7 inches in diameter approximate one end. Knock down type internal fasteners were provided for the alternate removable end panels for a neat appearance. The floor level opening 26 had a height of about 2 ¼ inches and a width corresponding to the width of the enclosure, or about 17 inches. A rubber adhesive tape was adhered to the lower edge of the fixed sides which had been previously primed to enhance adhesion to the board edges. The overall assembly weighed about 17 pounds.

In operation, the rubber edges were placed directly on a wood kitchen floor near a major traffic path through the kitchen. A food and water dish such as that shown in phantom at A were placed directly on the floor area bounded by the sides of the device, using the removable hatch opening. Three domestic cats were fed exclusively using this system for a period of two weeks. Once the cats became accustomed to the enclosure, all seemed quite comfortable in taking meals there, even when subjected to the considerable kitchen traffic, which would normally dissuade at least some of the feeding. The feeding station was kicked and jostled repeatedly, but little food or water were spilled as a result. The inevitable crumbs and debris were contained within the sides of the enclosure, and cleanup was merely a matter of lifting the enclosure and cleaning the thus exposed floor. Because of the relatively massive construction, the enclosure regularly functioned as a step stool for the children in the household. Also, the upper surface of the top member became a convenient place to store a small bag of dry cat food.

Many alternative constructions come to mind once the basic concept of the invention is understood. For example, high pressure laminates could be used to coordinate the feeding station with the kitchen countertops. Wood trim along the intersections of the side and top panels could give the construction the look of fine cabinetry. Some manufacturers sell continuous refilling style feeding systems B shown in phantom. The floor level opening 27 has a height which can receive the dish portion of these systems, leaving the upright food reservoir on the outside of the feeding station. Thus, the mass of the station can prevent these tower like systems from tipping over, while the user can readily see when the food in the reservoir needs replenishing. A lip could be placed around the perimeter of the top member 12 to retain cat food supplies or added weight in the top of the enclosure. Also, the location and number of access openings can be varied depending on where the enclosure is to be located in a room.

Of course, the invention can be used in any room in the house and can be coordinated with the furnishings of that room. And, although the invention has been described with regard to caring for cats, it is clear that it can be used with other small animals such as rabbits or small dogs. The dimensions given are only exemplary and others sizes can be chosen to accommodate particular animals and to protect the animal's food from other larger members of the same species or a different species.

I claim:

1. A feeding station for a domestic animal comprising a box-like enclosure resting on the surface of a floor for substantially entirely covering the animal to be fed and for at least partially covering at least one of a food and a water dish, said box-like enclosure having:

an open bottom, a generally flat top section, and four opaque side panels attached to said top section, said enclosure being of a size to be manually liftable for cleaning thereunder, whereby any spillage from the dishes will fall through the open bottom and can be easily accessed by lifting the enclosure, said enclosure having at least one access opening in at least one of said side panels to provide access to the interior of the enclosure for the animal to be fed, said top section including a transparent access panel therein providing access to the entire inside of said feeding station, and allowing the contents of the feeding station to be viewed, and allowing the animal being fed to see out of said feeding station, whereby the animal to be fed can fit in said box-like enclosure while eating.

2. A feeding station as in claim 1 wherein at least one of said side panels is dimensioned to define a slot for accepting a dish of a continuous-fill type feeder having a reservoir above the dish.

3. A feeding station as in claim 2 wherein said at least one side panel dimensioned to define a slot is removable and can be replaced with an alternative second side panel to create a box-like enclosure without said slot.

4. A feeding station for a small domestic animal comprising:

a box-like enclosure dimensioned for entirely covering the animal to be fed and for at least partially covering at least one of a food and a water dish, said box-like enclosure comprising an open bottom, four side panels, and a top panel attached to said four side panels, said enclosure being of a size to be manually liftable for cleaning thereunder, whereby any spillage from the dishes will fall through the open bottom and can be easily accessed by lifting the enclosure, said enclosure having at least one access opening in at least one of said side panels to provide access to the interior of the enclosure for the animal to be fed, said top panel having a transparent access panel therein providing access to the entire inside of said feeding station for allowing the interior contents of the feeding station to be viewed and for allowing the animal to see out of said feeding station, whereby the animal to be fed can fit in said box-like enclosure while eating.

5. A feeding station as in claim 4 wherein at least one of said side panels is dimensioned to define a slot for accepting a feeding dish of a continuous-fill type feeder having a food reservoir above the dish.

6. A feeding station as in claim 5 wherein said at least one side panel is dimensioned to define a slot is removable and can be replaced with an alternative second side panel which is dimensioned to creat a box-like enclosure without said slot.

7. A feeding station for a small domestic animal comprising:

a box-like enclosure dimensioned for entirely covering the animal to be fed and for at least partially covering a at least one of a food and a water dish, said box-like enclosure comprising four side panels, and a top panel attached to said four side panels,
said top panel having a transparent access panel therein providing access to the entire inside of said feeding station allowing the interior contents of the feeding station to be viewed and allowing the animal to see out of said feeding station, said enclosure being supported on a surface and being of a size to be manually liftable from said surface for cleaning thereunder, said enclosure having high friction means attached to surfaces thereof for contacting the surface on which said enclosure is supported,
whereby frictional engagement between said enclosure and said supporting surface resists the sliding of said enclosure whereby spilling of the dishes is resisted when said enclosure is bumped or jostled during use, said enclosure having at least one access opening in at least one of said side panels to provide access for the animal to be fed, whereby the animal to be fed can fit in said box-like enclosure while eating.

8. A feeding station as in claim 7 wherein at least one of said side panels is dimensioned to define a slot for accepting a dish of a continuous-fill type feeder having a food reservoir above the dish.

9. A feeding station as in claim 8 wherein said at least one side panel dimensioned to define slot and is removable and can be replaced with an alternative second side panel dimensioned to create a box-like enclosure without said slot.

10. A feeding station as in claim 7 wherein said side panels form a continuous edge normally contacting said supporting surface, and said high friction means is attached to said continuous edge.

* * * * *